United States Patent
Kurashige

(10) Patent No.: US 8,498,035 B2
(45) Date of Patent: Jul. 30, 2013

(54) PROJECTION TYPE IMAGE DISPLAY APPARATUS AND IMAGE DISPLAY METHOD

(75) Inventor: Makio Kurashige, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 248 days.

(21) Appl. No.: 12/857,720

(22) Filed: Aug. 17, 2010

(65) Prior Publication Data

US 2012/0044553 A1   Feb. 23, 2012

(51) Int. Cl.
*G02B 26/10* (2006.01)
*G03H 1/22* (2006.01)

(52) U.S. Cl.
USPC .............................................. 359/21; 359/33

(58) Field of Classification Search
USPC ...................................................... 359/21, 33
See application file for complete search history.

(56) References Cited

U.S. PATENT DOCUMENTS

| | | |
|---|---|---|
| 5,313,479 A | 5/1994 | Florence |
| 6,127,066 A * | 10/2000 | Ueda et al. ................. 430/1 |
| 2005/0190418 A1 * | 9/2005 | Kremen ....................... 359/31 |
| 2006/0146386 A1 * | 7/2006 | Yamatsu et al. ............. 359/25 |
| 2006/0171006 A1 * | 8/2006 | Fukumoto et al. .......... 359/10 |
| 2006/0250671 A1 * | 11/2006 | Schwerdtner et al. ....... 359/9 |

FOREIGN PATENT DOCUMENTS

| | | |
|---|---|---|
| JP | 6-208089 A | 7/1994 |
| JP | 2004-264512 A | 9/2004 |

OTHER PUBLICATIONS espacenet English abstract of JP 2004-264512 A.
espacenet English abstract of JP 6-208089 A.
Copending U.S. Appl. No. 12/857,752.
Goodman, J. W., "Speckle Phenomena in Optics", Roberts and Company Publishers, 2006, pp. 203-225.

* cited by examiner

*Primary Examiner* — Jade R Chwasz
(74) *Attorney, Agent, or Firm* — Ladas & Parry LLP

(57) ABSTRACT

Coherent light from a laser is magnified, made into a parallel light flux, and irradiated on a hologram recording medium in which a hologram image of a scatter plate is recorded. A hologram reproduction real image of the scatter plate is generated using the parallel light flux as illumination light for reproduction. The spatial light modulator consisting of a liquid crystal display, etc., is disposed so as to overlap on the position of the hologram reproduction real image, and a modulated image is obtained on the surface of the reproduction real image of the scatter plate. The modulated image is projected onto the screen by the projection optical system.

18 Claims, 9 Drawing Sheets

PRIOR ART

PRIOR ART

| | CONDITION | SPECKLE CONTRAST (%) |
|---|---|---|
| 1 | LASER (GREEN) WITHOUT DIFFUSING ELEMENT | 20.7 |
| 2 | LASER (GREEN) WITH DIFFUSING ELEMENT | 17.9 |
| 3 | LED (GREEN) WITHOUT DIFFUSING ELEMENT | 4.0 |

PROJECTION TYPE IMAGE DISPLAY APPARATUS AND IMAGE DISPLAY METHOD

BACKGROUND OF THE INVENTION

The present invention relates to a projection type image display apparatus and an image display method, and in particular, relates to a technology for displaying images on a screen by illuminating a spatial light modulator using light from a coherent light source.

As a projection type image display apparatus for displaying images by projecting light onto a screen, various types of apparatuses have been proposed, including an apparatus available on the market, which is a so-called "optical type projector." The basic principle of such a projection type image display apparatus is to generate an original two-dimensional image by utilizing a spatial light modulator such as a liquid crystal micro-display or a DMD (Digital Micro-mirror Device), and to magnify and project the two-dimensional images on a screen by utilizing a projection optical system.

A general optical type projector adopts a system which illuminates a spatial light modulator such as a liquid crystal display using a white light source such as a high pressure mercury lamp, magnifies a modulated image thus obtained, by means of lenses and projects the same on a screen. For example, Japanese Patent Publication No. 2004-264512A discloses a technology that divides white light generated by a super high pressure mercury lamp into three prime color components of R (red), G (green), and B (blue) by means of a dichroic mirror, leads these lights to respective spatial light modulators for the prime colors, synthesizes modulated images thus generated for each of the prime colors by means of a cross dichroic prism and projects the same on a screen.

However, the service life of a high brightness discharge lamp such as a high pressure mercury lamp is comparatively short, wherein if such a lamp is utilized in an optical type projector, etc., it is necessary to frequently change the lamp. Further, since it is necessary to utilize a comparatively large optical system such as a dichroic mirror, in order to pick up lights of respective prime colors, there is a disadvantage that the entire apparatus becomes large-sized. Therefore, a system which uses a coherent light source such as a laser has been proposed. For example, a semiconductor laser which is widely utilized industrially has a remarkably long service life in comparison with a high brightness discharge lamp such as a high pressure mercury lamp. Also, since the semiconductor laser is a light source which is able to generate light of a single wavelength, a spectroscopic instrument such as a dichroic mirror is no longer required, so that there is an advantage that the entire apparatus can be made small-sized.

On the other hand, in a system in which a coherent light source such as a laser is used, a new problem of generation of speckles is brought about. The speckles form a spot-like pattern appearing when coherent light such as a laser light is irradiated on a diffusing surface, and is observed as spot-like unevenness in brightness, which is generated on a screen. The speckles become a factor which adversely physiologically affects an observer. The reason why speckles are generated when the coherent light is used is that the coherent lights reflected from respective parts of a diffusing reflection surface such as a screen have remarkably high coherency and the lights interfere with each other. For example, "Speckle Phenomena in Optics" by Joseph W. Goodman, Roberts & Company Publishers 2006, provides detailed theoretical consideration with respect to generation of speckles.

Thus, since a problem inherent to the system using a coherent light source, which is generation of speckles, is brought about in the system, a technology to control generation of speckles has been proposed. For example, Japanese Patent Publication No. 6-208089A(1994) discloses a technology in which laser light is irradiated to a scatter plate, the thus obtained scattered light is led to a spatial light modulator, and the scatter plate is driven and rotated by a motor, thereby reducing the speckles.

As described above, although, in a projection type image display apparatus using a coherent light source, a technology to reduce speckles has been proposed, it is not possible to efficiently and sufficiently control the speckles by means of conventionally proposed methods. For example, with the method disclosed in Japanese Patent Publication No. 6-208089A(1994), since laser light is irradiated onto a scatter plate and is scattered, a part of the laser light is wasted without contributing to image display. In addition, although it is necessary to rotate the scatter plate in order to reduce the speckles, such a mechanical rotation mechanism becomes a comparatively large apparatus, and power consumption is increased. Further, since the position of the optical axis of illumination light does not change even if the scatter plate is rotated, it is not possible to sufficiently control the speckles generated on the diffusing surface of a screen.

SUMMARY OF THE INVENTION

Therefore, it is an object of the present invention to provide a technology capable of efficiently and sufficiently controlling generation of speckles in a projection type image display apparatus using a coherent light source.

(1) The first feature of the present invention resides in a projection type image display apparatus for projecting light onto a screen and displaying an image thereon, comprising:

a coherent light generating unit for generating coherent light including almost parallel light flux;

a hologram recording medium for generating a hologram reproduction real image of a scatter plate by receiving the coherent light as illumination light for reproduction;

a spatial light modulator disposed so as to overlap on a position where the hologram reproduction real image is generated; and a projection optical system for projecting a modulated image obtained on the spatial light modulator onto the screen.

(2) The second feature of the present invention resides in the projection type image display apparatus according to the first feature, wherein the coherent light generating unit includes:

a laser light source for generating and emitting laser light; and a optical system for magnifying a light flux, which widens the laser light emitted from the laser light source to an almost parallel light flux having a predetermined sectional area.

(3) The third feature of the present invention resides in the projection type image display apparatus according to the first feature, wherein the hologram recording medium is composed of a volume hologram using a photopolymer.

(4) The fourth feature of the present invention resides in the projection type image display apparatus according to the first feature, wherein the coherent light generating unit generates coherent light having a wavelength which is almost the same as a wavelength of light used when recording an image of a scatter plate on a hologram recording medium; and the hologram recording medium is disposed in a "direction along which an incident angle of the coherent light to a corresponding hologram recording medium becomes identical to an incident angle of reference light used when recording the image of the scatter plate."

(5) The fifth feature of the present invention resides in the projection type image display apparatus according to the first feature, wherein
the spatial light modulator is composed of a transmission type or a reflection type liquid crystal display or digital micromirror device.

(6) The sixth feature of the present invention resides in the projection type image display apparatus according to the first feature, wherein
the projection optical system carries out forward projection by which a modulated image is projected to an observation surface of a screen.

(7) The seventh feature of the present invention resides in the projection type image display apparatus according to the first feature, wherein
characteristics and an arrangement of the spatial light modulator and characteristics and an arrangement of the projection optical system are set so that either of distribution angles of incident light to any optional point on the screen becomes 0.4 degrees or more.

(8) The eighth feature of the present invention resides in the projection type image display apparatus according to the first feature, further including a drive mechanism for cyclically moving the hologram recording medium.

(9) The ninth feature of the present invention resides in the projection type image display apparatus according to the eighth feature, wherein
the drive mechanism causes the hologram recording medium to cyclically make a parallel movement in a plane parallel to the recording surface thereof.

(10) The tenth feature of the present invention resides in the projection type image display apparatus according to the ninth feature, wherein
when an XY two-dimensional orthogonal coordinate system is defined on a recording surface of the hologram recording medium, the drive mechanism causes the hologram recording medium to make simple harmonic oscillations in an X-axis or a Y-axis direction or causes the hologram recording medium to make a circular motion or an elliptical motion on an XY-plane.

(11) The eleventh feature of the present invention resides in the projection type image display apparatus according to the eighth feature, wherein
characteristics and an arrangement of the spatial light modulator and characteristics and an arrangement of the projection optical system are set so that either of distribution angles of incident light to any optional point on the screen becomes 0.4 degrees or more, and
the drive mechanism drives the hologram recording medium so that a linear speed of light used for scanning on the screen becomes 200 mm or more per second.

(12) The twelfth feature of the present invention resides in the projection type image display apparatus according to the first feature, further including a drive mechanism for causing lenses, which compose the projection optical system, to cyclically move in a plane perpendicular to an optical axis thereof.

(13) The thirteenth feature of the present invention resides in the projection type image display apparatus according to the first feature, further including a drive mechanism for causing the spatial light modulator to cyclically move along a modulated image forming surface.

(14) The fourteenth feature of the present invention resides in the projection type image display apparatus according to the first feature, further including a drive mechanism for causing the entire apparatus, which is composed of the coherent light generating unit, the hologram recording medium, the spatial light modulator, and the projection optical system, to totally move cyclically.

(15) The fifteenth feature of the present invention resides in a projection type image display apparatus for projecting light onto a screen and displaying a color image thereon, comprising:
a first unit for generating coherent light of a first wavelength, which consists of a parallel light flux;
a first hologram recording medium for generating a first hologram reproduction real image of a scatter plate by receiving coherent light of the first wavelength as illumination light for reproduction;
a first spatial light modulator which is disposed so as to overlap on a forming position of the first hologram reproduction real image and carries out modulation based on an image having a first primary color component corresponding to the first wavelength;
a second unit for generating coherent light of a second wavelength, which consists of a parallel light flux;
a second hologram recording medium for generating a second hologram reproduction real image of a scatter plate by receiving coherent light of the second wavelength as illumination light for reproduction;
a second spatial light modulator which is disposed so as to overlap on a forming position of the second hologram reproduction real image and carries out modulation based on an image having a second primary color component corresponding to the second wavelength;
a third unit for generating coherent light of a third wavelength, which consists of a parallel light flux;
a third hologram recording medium for generating a third hologram reproduction real image of a scatter plate by receiving coherent light of the third wavelength as illumination light for reproduction;
a third spatial light modulator which is disposed so as to overlap on a forming position of the third hologram reproduction real image and carries out modulation based on an image having a third primary color component corresponding to the third wavelength; and
a synthesizing projection optical system for synthesizing a first modulated image obtained on the first spatial light modulator, a second modulated image obtained on the second spatial light modulator, and a third modulated image obtained on the third spatial light modulator, and projecting a synthesized image onto the screen.

(16) The sixteenth feature of the present invention resides in a projection type image display method for projecting light onto a screen and displaying an image thereon, comprising the steps of;
creating a hologram recording medium on which a hologram image of a scatter plate is recorded;
generating a hologram reproduction real image of the scatter plate by irradiating coherent light onto the hologram recording medium;
disposing a spatial light modulator so as to be overlapped on a generation position of the hologram reproduction real image; and
projecting a modulated image obtained on the spatial light modulator on the screen.

(17) The seventeenth feature of the present invention resides in the projection type image display method according to the sixteenth feature, wherein a hologram recording medium is caused to cyclically make a parallel movement on a plane parallel to a recording surface thereof while a modulated image is being projected on the screen.

(18) The eighteenth feature of the present invention resides in the projection type image display method according to the seventeenth feature, wherein a distribution angle of incident light is caused to become 0.4 degrees or more at any optional point on a screen, and a linear speed of light scanning on the screen is caused to become 200 mm or more per second.

In the present invention, a hologram reproduction of a real image of a scatter plate is formed at the position of the existing spatial light modulator so as to overlap on the position. Therefore, a modulated image obtained on the spatial light modulator will be projected on a screen with a behavior similar to the scattered light directly scattered from the scatter plate, and becomes able to efficiently and sufficiently control generation of speckles on the screen. Also, in an embodiment provided with a drive mechanism for causing a hologram recording medium to cyclically move, since light flux scanning is carried out on the screen, it becomes possible to further reduce generation of speckles.

DESCRIPTION OF THE PREFERRED EMBODIMENTS

Hereinafter, a description is given of the present invention based on the illustrated embodiment.

<<<Section 1. Conventionally Proposed Projection Type Image Display Apparatus>>>

Figure 1:
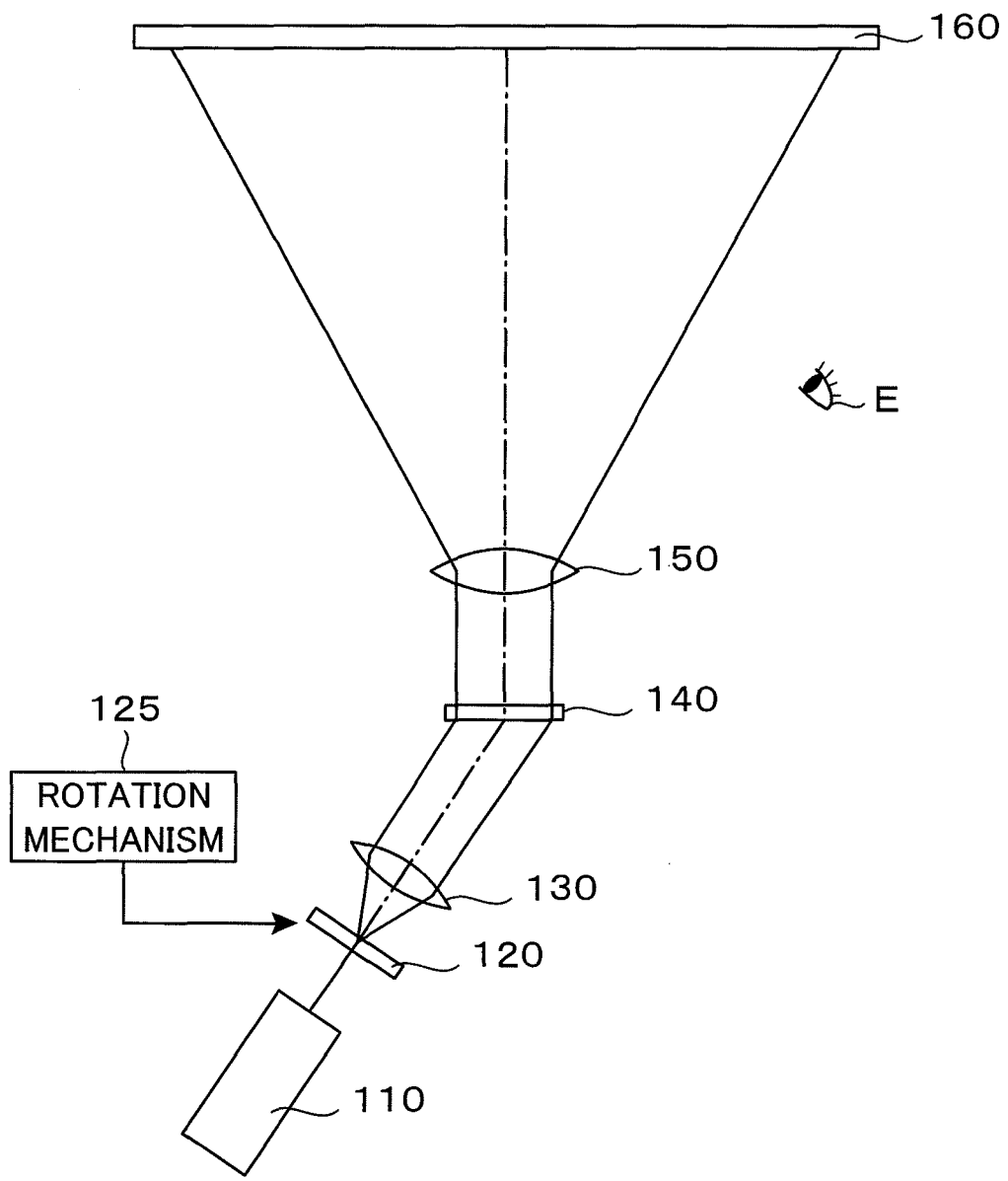
FIG. 1 is a plan view showing an example of a coherent light projection type image display apparatus having a function of controlling generation of speckles, which has conventionally been proposed.

Here, for convenience, a description is given of the basic principle of a conventional projection type image display apparatus using coherent light which was proposed in, for example, Japanese Patent Publication No. 6-208089A(1994), etc., with reference to the plan view of FIG. 1.

As illustrated, in the projection type image display apparatus, coherent light generated from a coherent light source 110 such as a laser is irradiated onto a transmission type scatter plate 120, the thus obtained scattered light is condensed by a light condensing lens 130, and is led to a spatial light modulator 140. If, for example, a transmission type liquid crystal micro-display is used as the spatial light modulator 140, a modulated image will be obtained on a screen of the display. If the thus obtained modulated image is projected onto a screen 160 by means of a projection optical system 150, a magnified modulated image will be displayed on the screen 160.

In addition, a reflection type micro-display may be used as the spatial light modulator 140. In this case, the coherent light source 110, the scatter plate 120 and the light condensing lens 130 are disposed obliquely upwards of the spatial light modulator 140 in FIG. 1, wherein the reflection light from the spatial light modulator 140 will be projected on the screen 160 by the projection optical system 150. Where such reflection light is utilized, a MEMS element such as a DMD (Digital Micro-mirror Device) may be used as the spatial light modulator 140. In fact, the embodiment disclosed in Japanese Patent Publication No. 6-208089A(1994) is a reflection type apparatus in which the DMD is utilized as the spatial light modulator 140.

In addition, although the illustrated example is a forward projection type apparatus in which a subject is observed in a state where the viewpoint E is placed at this side of the screen 160, a rearward projection type apparatus in which a subject is observed in a state where the viewpoint E is placed at the other side of the screen 160 (a so-called rear projection apparatus) is widely utilized.

As already described above, in an apparatus in which a coherent light source 110 such as a laser is utilized, a problem by which speckles are generated on the screen 160 is brought about. A speckle is a spot-like pattern appearing when coherent light is irradiated on a scatter surface, which is brought about by interference of the coherent light reflected from respective parts of the scatter surface. Therefore, in the embodiment disclosed in Japanese Patent Publication No. 6-208089A(1994), such a device is applied, which reduces generation of speckles by driving and rotating the scatter plate 120 with the optical axis of laser light used as the center axis by the rotation mechanism 125.

The above-mentioned "Speckle Phenomena in Optics" by Joseph W. Goodman refers to that, in order to reduce generation of speckles, it is effective to multiplex the modes of polarization, phase, or angle spatially or timely. If the scatter plate 120 is driven and rotated, the modes of the scattered light emitted from the scatter plate 120 are multiplexed, and it is possible to resultantly reduce generation of speckles on the screen 160.

Figure 2:
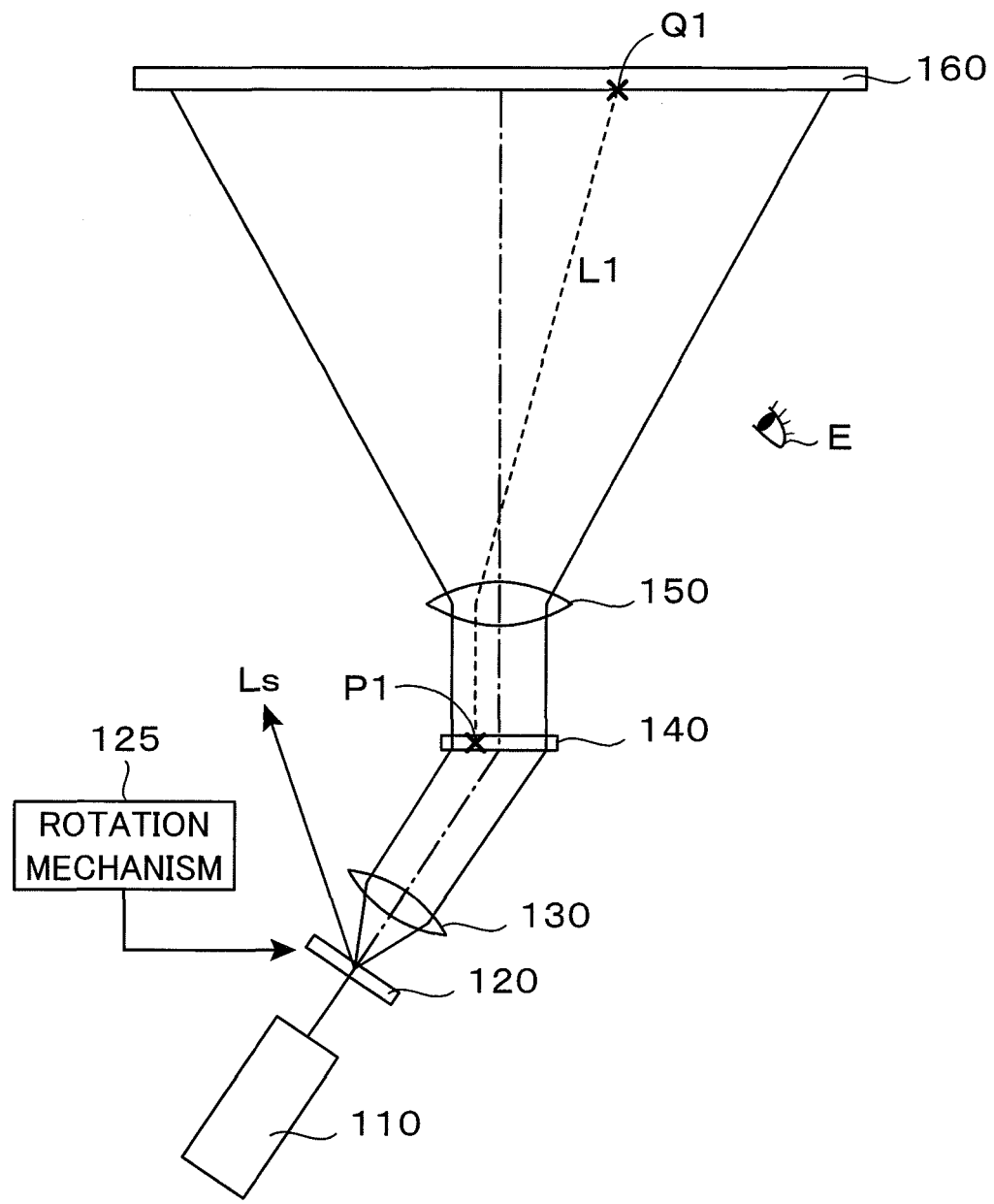
FIG. 2 is a plan view to show problematic points in the projection type image display apparatus shown in FIG. 1.

However, in the apparatus of such a type as conventionally proposed, it is difficult to efficiently and sufficiently control generation of speckles as described above. FIG. 2 is a plan view showing problematic points of the projection type image display apparatus shown in FIG. 1. The configuration itself of the apparatus shown in FIG. 2 is identical to that of the apparatus shown in FIG. 1. Hereinafter, with reference to FIG. 2, a detailed description is given of some problematic points of the prior art apparatus.

First, since laser light irradiated onto the scatter plate 120 is scattered in various directions, there exists scattered light going in directions along which the laser light is not condensed by the light condensing lens 130, for example, like the light exemplarily illustrated as the scattered light Ls in FIG. 2. Thus, since a part of the laser light is wasted without contributing to the image display, there is a problem in view of utilization efficiency of energy.

Second, driving and rotating of the scatter plate 120 by the rotation mechanism 125 to reduce the speckles cannot be necessarily said to be an efficient method. That is, the greater the mass of the scatter plate 120 is, the more the power consumption is brought about to rotate the scatter plate. Actually, power necessary to give a rotating moment to the scatter plate 120 at all times cannot be disregarded, and since a mechanical rotating structure is needed, this hinders downsizing of the apparatus.

And, third, since the position of the optical axis of the illumination light supplied from the coherent light source 110 to the screen 160 is not changed even if the scatter plate 120 is rotated, it is not possible to sufficiently control speckles generated on the scatter surface of the screen 160. In the case of the apparatus shown in FIG. 2, scattering of light contributing to generation of speckles is originated on two surfaces which are a surface of the scatter plate 120 and a surface of the screen 160. If the scatter plate 120 is rotated, speckles (that is, speckles resulting from the light source side of the illumination light) resulting from scattering on the scatter plate 120 can be reduced. However, speckles (that is, speckles resulting from the screen side) resulting from scattering on the screen 160 cannot be reduced sufficiently.

Here, attention is paid to the distribution angle of incident light (as described later, the distribution range of the incident angle onto the screen 160) of projection light L1 reaching an optional projection point Q1 on the screen 160 illustrated. In the case of the illustrated apparatus, the spatial light modulator 140 has a function of transmitting the illumination light, which is incident from the light condensing lens 130, toward the projection optical system 150 after modulating the illumination light. Therefore, pixel information of the image point P1 will be projected, as it is, to the projection point Q1 on the screen 160 by the projection light L1. This means that the distribution angle of incident light is remarkably narrow when the projection optical system 150 is observed from the projection point Q1. Even if the scatter plate 120 is rotated, the optical path of the projection light L1 illuminating the projection point Q1 does not change, and the incident angle becomes constant at all times. Thus, if the coherent light is irradiated to the surface of the screen 160 from the same direction at all times, this becomes a major factor to generate speckles, wherein driving and rotating of the scatter plate 120 are useless in view of reducing such speckles resulting from the screen side.

The present invention proposes a novel technology to solve such problems of such prior art apparatus. Hereinafter, a description is given of the basic embodiment of the present invention.

<<<Section. 2 Basic Embodiment of the Present Invention>>>

Figure 3:
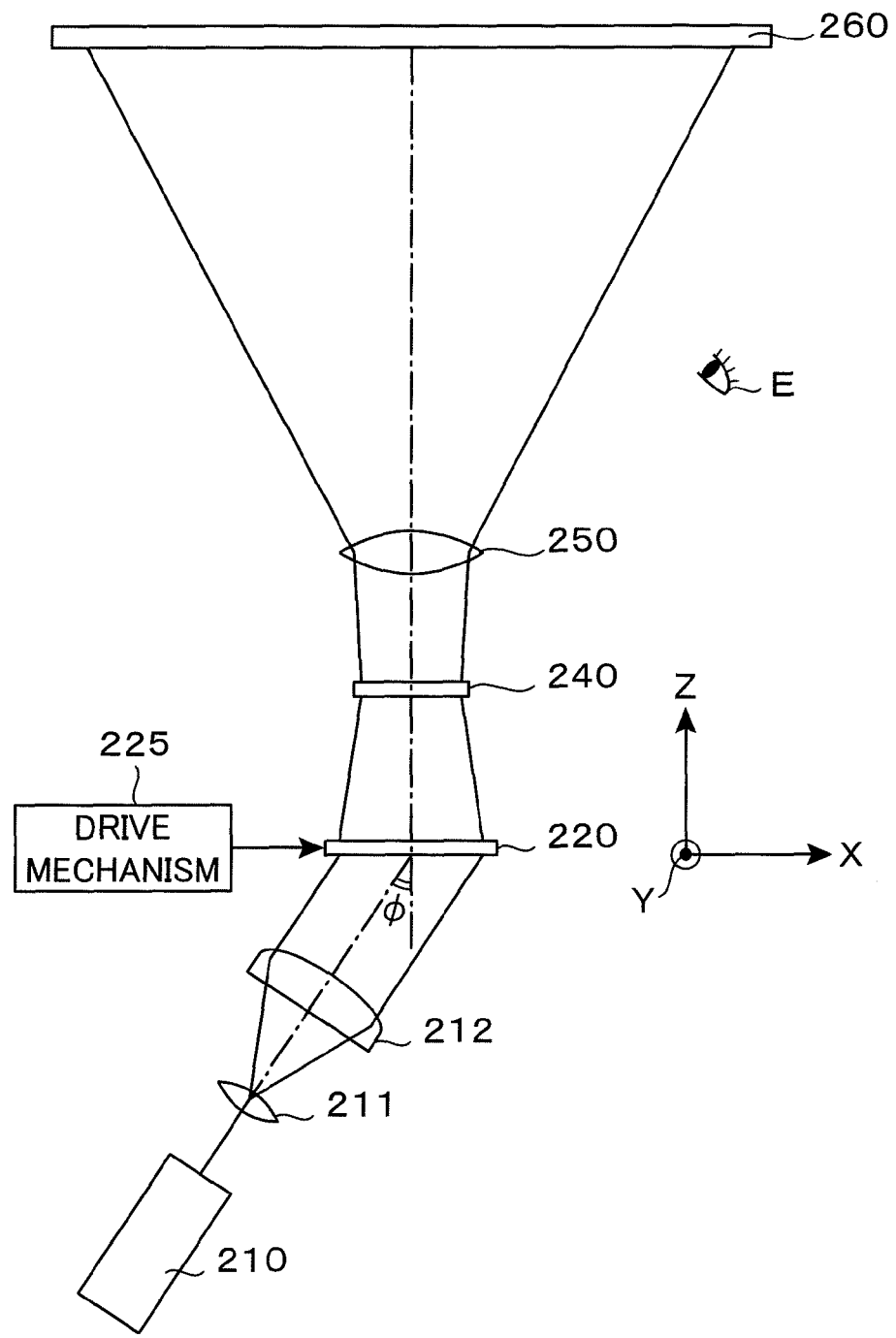
FIG. 3 is a plan view showing a basic embodiment of a projection type image display apparatus according to the present invention.

FIG. 3 is a plan view showing a basic embodiment of a projection type image display apparatus according to the present invention. In the projection type image display apparatus, coherent light generated from a coherent light source 210 is used. In the case of the apparatus, a laser light source which generates and emits laser light is adopted as the coherent light source 210. The emitted laser light is widened to a parallel light flux having a predetermined sectional area by means of light flux magnifying unit consisting of a magnification lens 211 and a collimate lens 212. Also, in actual applications, the light flux is not strictly a parallel light flux, and an almost parallel light flux may be used and does not constitute any hindrance.

Thus, the illustrated coherent light source 210 (laser light source), magnification lens 211, and collimate lens 212 function as means for generating coherent light, which generates coherent light consisting of a parallel light flux. As illustrated, the coherent light consisting of a parallel light flux is incident into a hologram recording medium 220 at a predetermined incident angle $\theta$. As described later, the coherent light consisting of the parallel light flux functions as illumination light for reproduction to the hologram recording medium 220. Therefore, the magnification lens 211 and the collimate lens 212 magnify the light flux of a laser beam so that the illumination light for reproduction consisting of a parallel light flux is irradiated on the entire recording surface of the hologram recording medium 220. In other words, the section of the parallel light flux has an area which is necessary and sufficient to irradiate the entire recording surface of the hologram recording medium 220. As a matter of course, since respective points of the hologram recording medium 220 have a function of reproducing an image of the scatter plate, the illumination light for reproduction is not necessarily required to have a sectional area necessary to irradiate the entire recording surface.

A hologram image of a scatter plate (optical diffusing plate) is recorded in advance on the hologram recording medium 220, and when the coherent light consisting of the above parallel light flux is irradiated as illumination light for reproduction, a hologram reproduction real image of the corresponding scatter plate is generated.

Figure 4:
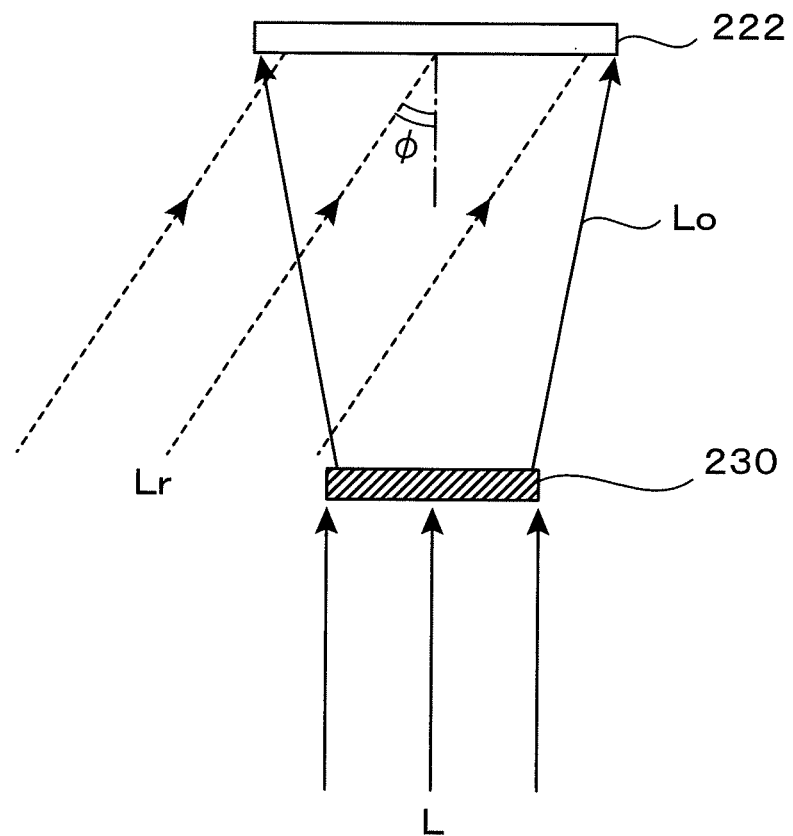
FIG. 4 is a plan view showing a method for creating a hologram recording medium 220 in the apparatus shown in FIG. 3.

FIG. 4 is a plan view showing a method for creating the hologram recording medium 220. The scatter plate 230 shown in the drawing is a transmission type scatter plate (for example, an opal glass plate) inside which fine grains (light scattering substances) to scatter light are kneaded, and the hologram photosensitive medium 222 is a photosensitive medium used to record a hologram image. In the illustrated example, laser light having a predetermined wavelength $\lambda$ is irradiated from downwards of the scatter plate 230 as illumination light L, and a hologram is recorded by using scattered light, which is produced by scattering based on the scattered plate 230, as substance light Lo. At this time, laser light having the same wavelength $\lambda$ as the illumination light L is irradiated to the hologram photosensitive medium 222 at the incident angle $\phi$ as the reference light Lr, wherein an interference fringe pattern between the substance light Lo and the reference light Lr is recorded on the recording surface of the hologram photosensitive medium 222.

Figure 5:
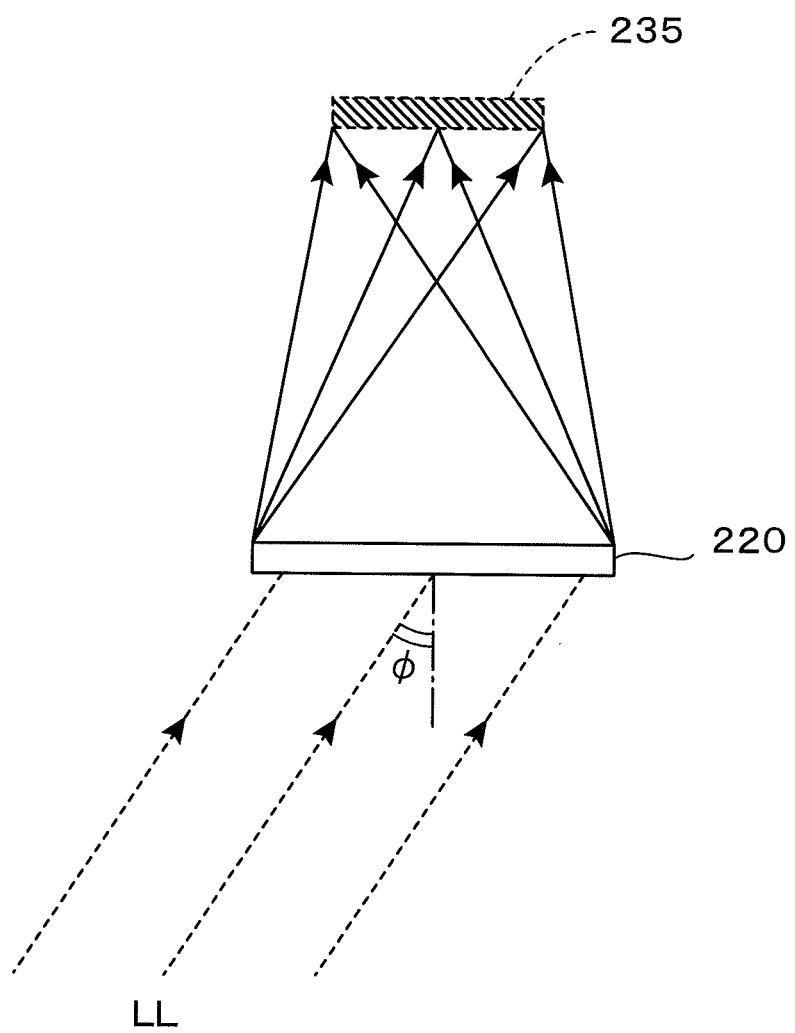
FIG. 5 is a plan view showing a state of reproducing a real image by the hologram recording medium 220 in the apparatus shown in FIG. 3.

FIG. 5 is a plan view showing a state of real image reproduction by the hologram recording medium 220 thus created. The hologram recording medium 220 shown in FIG. 5 corresponds to the hologram photosensitive medium 222 (recording of hologram has been completed) shown in FIG. 4. However, the hologram recording medium 220 is inversely disposed with the upside down in the drawing. That is, in the process shown in FIG. 4, what the already recorded hologram photosensitive medium 222 is disposed with the upside down after the recording of hologram has been completed is the hologram recording medium 220 shown in FIG. 5.

As shown in FIG. 5, if the laser light having wavelength $\lambda$ (the same wavelength as that of the illumination light L or the reference light Lr, which is used in the recording process in FIG. 4) is irradiated, as the illumination light for reproduction LL, from downwards of the hologram recording medium 220 at the incident angle $\phi$, a hologram reproduction real image 235 of the scatter plate is produced upwards of the drawing. The hologram reproduction real image 235 is a reproduction image the original image of which is based on the scatter plate (opal glass plate) shown in FIG. 4.

The coherent light source (laser light source) 210 used in the apparatus shown in FIG. 3 is a light source to generate the illumination light for reproduction LL shown in FIG. 5, which generates coherent light having the same wavelength λ as that of the illumination light L or the reference light Lr, which is used in the recording process in FIG. 4. The coherent light is irradiated to the hologram recording medium 220 at the incident angle φ as described above. Here, the incident angle φ is equal to the incident angle φ of the reference light Lr in the hologram recording process shown in FIG. 4. Accordingly, in FIG. 3, the hologram reproduction real image 235 will be obtained at an upper position of the hologram recording medium 220. In addition, actually, there is a case where the medium material may shrink in the process for creating the hologram recording medium 220. In such a case, it is preferable that the wavelength of the illumination light for reproduction LL is adjusted with the shrinkage of the material taken into consideration. Therefore, it is not necessary that the wavelength of the coherent light generated in the coherent light source 210 is strictly agreed with the wavelength of light used in the recording process in FIG. 4, wherein it is sufficient that both the wavelengths are roughly equal to each other.

An important feature of the present invention exists in that the spatial light modulator 240 is disposed so as to overlap on the generation position of the hologram reproduction real image 235. Here, although the spatial light modulator 240 is an existing device such as a liquid crystal micro-display and a DMD (Digital Micro-mirror Device), the hologram reproduction real image 235 is an optical reproduction image, wherein both may be disposed so as to overlap in the same space. Although only the existing spatial light modulator 240 is depicted in FIG. 3, the hologram reproduction real image 235 of the scatter plate, which is reproduced by the hologram recording medium 220, overlaps in the same space.

As a matter of course, the substance of the hologram reproduction real image 235 thus obtained is coherent light diffracted by interference fringes formed in the hologram recording medium 220, and the spatial light modulator 240 receives illumination by such coherent light and generates a predetermined modulated image. For example, where a transmission type liquid crystal micro-display is used as the spatial light modulator 240, a modulated image will be obtained as the contrast pattern of illumination light which has passed through the display.

The projection optical system 250 carries out a function of projecting a modulated image thus obtained on the spatial light modulator 240 on the screen 260. Where a transmission type liquid crystal micro-display is used as the spatial light modulator 240, the modulated image formed on the display is projected onto the screen 260 and the image is displayed.

The apparatus shown in FIG. 3 is further provided with a drive mechanism 225 for cyclically moving the hologram recording medium 220. In further detail, the drive mechanism 225 carries out a function of causing the hologram recording medium 220 to cyclically make a parallel movement in a plane parallel to the recording surface. For example, as illustrated, if an XYZ three-dimensionally orthogonal coordinate system is defined in which the right direction of the drawing is the X-axis, the upward direction thereof is the Z-axis, and the perpendicular direction of the paper of the drawing is the Y-axis, and the recording surface of the hologram recording medium 220 is disposed so as to be included in the XY-plane, the drive mechanism 225 carries out a function of cyclically making parallel movement with the hologram recording medium 220 maintained in a state where the recording surface thereof is included in the XY-plane. Here, the "parallel movement" means a motion not including any rotating factor, and the hologram recording medium 220 carries out a motion of changing only the position in the XY-plane with the same posture maintained.

Figure 6:
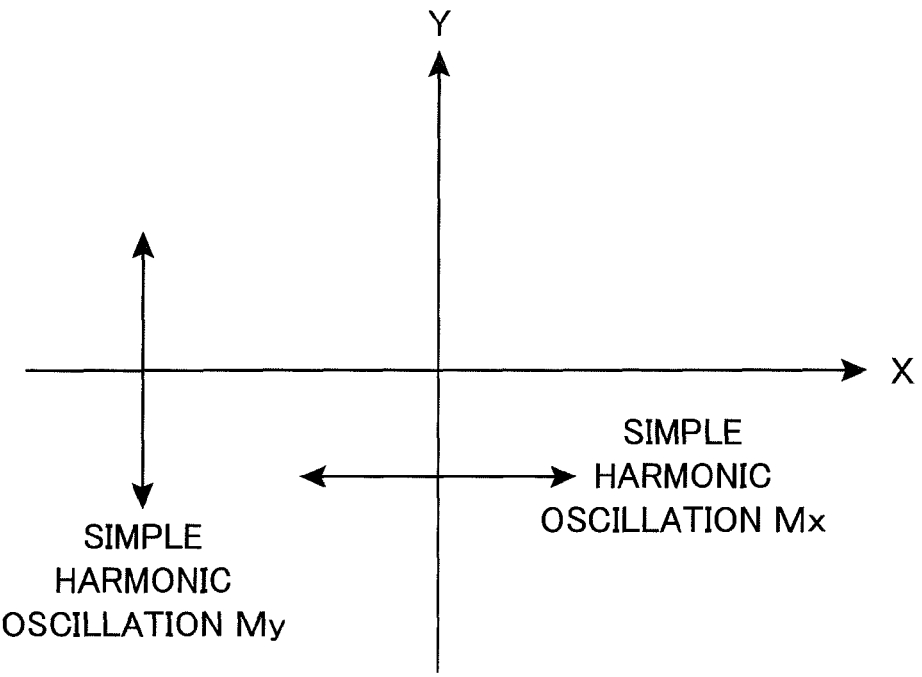
FIG. 6 is a plan view showing an example of a drive mode of the hologram recording medium 220 in the projection type image display apparatus shown in FIG. 3.
Figure 7:
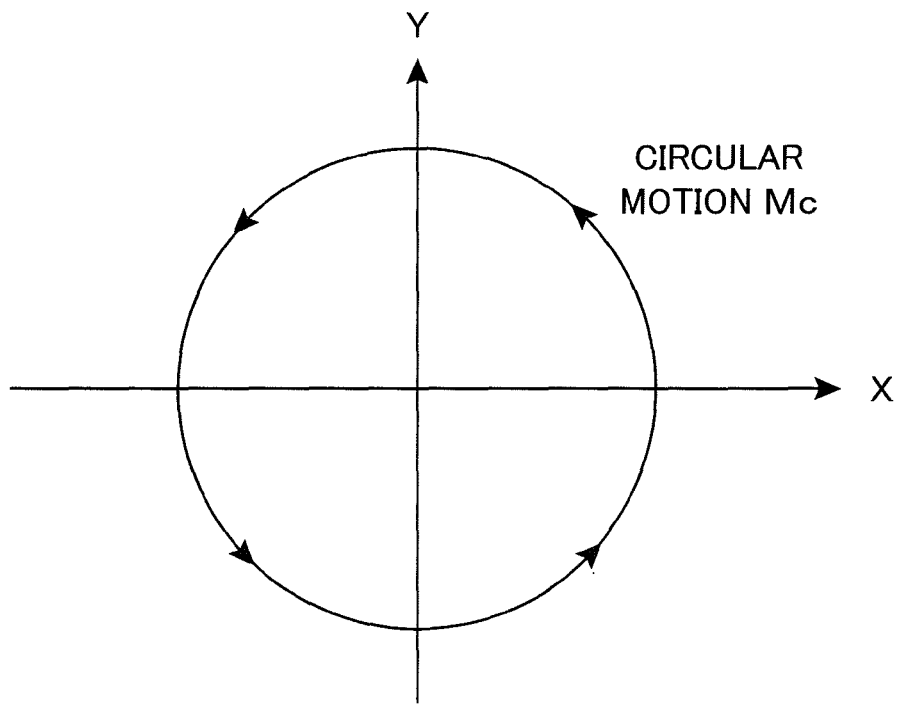
FIG. 7 is a plan view showing an example of another drive mode of the hologram recording medium 220 in the projection type image display apparatus shown in FIG. 3.

FIG. 6 and FIG. 7 are plan views showing one example of drive mode of the hologram recording medium 220 on such an XY-plane. FIG. 6 shows an example of causing the hologram recording medium 220 to make simple harmonic oscillation along the X-axis direction as shown by the arrow Mx or causing the same to make simple harmonic oscillation along the Y-axis direction as shown by the arrow My. In either case, the motion of the hologram recording medium 220 does not include any rotating factor but becomes a cyclic parallel movement along the arrow Mx or the arrow My. FIG. 7 shows an example for causing the hologram recording medium 220 to make a circular motion on the XY-plane, wherein although the hologram recording medium 220 moves along the circular locus shown by the arrow Mc, the motion of the hologram recording medium 220 does not include any rotating factor in this case, and carries out only a parallel movement. An elliptical motion may be made instead of a circular motion.

Since, in regard to such cyclic motions, the recording surface of the hologram recording medium 220 maintains its position on the XY-plane at all times, the incident angle φ of the parallel light flux emitted from the collimate lens 212 into the hologram recording medium 220 does not change. As a matter of course, if the hologram recording medium 220 is moved along the XY-plane, the position of the reproduction image obtained will move in parallel. However, there is no change in that a hologram reproduction real image 235 of the scatter plate is obtained at the position of the spatial light modulator 240 disposed apart by a predetermined distance from the hologram recording medium 220.

Where, in the hologram recording process shown in FIG. 4, the plane size of the scatter plate 230 used as an original image is made greater by a predetermined amount Δ than the plane size of the image forming surface of the spatial light modulator 240, and the amplitude of the simple harmonic oscillation Mx, My and the diameter of the circular motion Mc are controlled to be less than the predetermined amount Δ, the reproduction real image 235 of the scatter plate 230 is obtained on the image forming surface of the spatial light modulator 240 at all times even when the hologram recording medium 220 is moved.

Thus, the reason why the hologram recording medium 220 is cyclically moved by the drive mechanism 225 is to reduce speckles produced on the screen 260. The basic principle will be described in Section 4. Also, the motion conditions to efficiently reduce the speckles will be described in detail in Section 5.

<<<Section 3 Embodiment Showing a Detailed Configuration of Individual Elements and a Modified Version Thereof>>>

Subsequently, based on an apparatus according to an example experimentally produced by the present inventor, a description is given of a detailed configuration example of individual elements of a projection type image display apparatus shown in FIG. 3.

First, a DPSS (Diode Pumped Solid State) laser capable of emitting laser light the wavelength λ of which is 532 nm (green) was used as the coherent light source 210. Since the DPSS laser is able to bring about comparatively high output laser light of a desired wavelength although it is small-sized, the DPSS laser is suitable as the coherent light source used for a projection type image display apparatus as in the present invention. In addition, any lens may be used as the magnification lens 211 and the collimate lens 212 if the lenses are capable of magnifying the light flux of laser light emitted from the DPSS laser and generating a parallel light flux.

On the other hand, as already described above, the hologram recording medium 220 is created by the hologram recording process shown in FIG. 4. An opal glass plate (generally available on the market as an optical diffusing plate) the plane size of which is slightly greater than that of the spatial light modulator 240 was used as the scatter plate 230 that becomes an original image. Also, in order to generate the illumination light L and reference light Lr used in the hologram recording process, a DPSS laser capable of emitting laser light the wavelength $\lambda$ of which is 532 nm (green) described above was used.

As a result, the coherent light source 210 which functions as means for generating coherent light will become a light source for generating coherent light having the same wavelength as the wavelength of the light used when recording an image of the scatter plate 230. And, the hologram recording medium 220 shown in FIG. 3 will be disposed in "such a direction as the incident angle $\phi$ (angle $\phi$ in FIG. 3) of the coherent light to the corresponding hologram recording medium 220 and the incident angle $\phi$ (angle $\phi$ in FIG. 4) of the reference light Lr used when recording the image of the scatter plate 230 become identical to each other."

Here, it is preferable that a volume hologram using a photopolymer is used as the hologram recording medium 220. Generally, a hologram utilized as a falsification preventing seal in a cash card, a cash voucher, etc., is called a relief (embossed) hologram, in which hologram interference fringes are recorded as a surface relief structure. However, in the case of the relief hologram, since there is a possibility for scattering based on the surface relief structure to become a new factor for speckle generation, the relief hologram is not suitable for utilization in a projection type image display apparatus as in the present invention. Since, in the volume hologram, hologram interference fringes are recorded as distribution of refractive indexes in the interior of the medium, there is no case where the volume hologram is influenced by scattering based on the surface relief structure.

As a matter of course, even if a volume hologram is of such a type in which recording is carried out by utilizing a photosensitive medium including silver halide material, there is a possibility for scattering based on silver halide particles to become a new factor for speckle generation. Therefore, it is preferable to avoid use of such a volume hologram. Based on such a reason, the present inventor considers that a volume hologram using a photopolymer is most suitable as the hologram recording medium 220 utilized for the present invention. A detailed chemical composition of such a volume hologram using photopolymer is exemplarily shown in Japanese Patent Publication No. 2849021.

In addition, the embodiment shown in FIG. 3 shows an example of a transmission type hologram recording medium 220 which generates a hologram reproduction real image by transmitting illumination light for reproduction. However, it does not matter that a reflection type hologram recording medium which generates a hologram reproduction real image by reflecting illumination light for reproduction is used. In this case, it is sufficient that the coherent light source 210, the magnification lens 211 and the collimate lens 212 are disposed so that illumination light for reproduction is irradiated obliquely upwards of the hologram recording medium 220 shown in FIG. 3.

In addition, although, in the embodiment shown in FIG. 3, the light source 210 and the lenses 211 and 212 are disposed obliquely downward with respect to the hologram recording medium 220, the light source 210 and the lens 211 and 212 may be disposed right below the hologram recording medium 220 if such a mechanism is taken so that the incident angle becomes $\phi$ with respect to the hologram recording medium 220. For example, even if such an arrangement is adopted so that the illumination light for reproduction is made incident into a polarization element plate from perpendicularly downward where the polarization element plate is adhered to the underside of the hologram recording medium 220, no particular problem is brought about as far as the incident angle to the hologram recording medium 220 becomes $\phi$ by a polarization action of the polarization element plate.

In addition, although, in the recording process shown in FIG. 4, a so-called Fresnel type hologram recording medium is created, it does not matter that a Fourier transformation type hologram recording medium, which is obtained by carrying out recording using lenses, is created. However, where the Fourier transformation type hologram recording medium is used, lenses will be required when reproducing the image.

On the other hand, as described above, the transmission type liquid crystal micro-display was used as the spatial light modulator 240. With this display, since it is possible to control the transmission ratio of light for individual pixels by changes in phase of liquid crystal based on electrical signals, it is possible to generate a modulated image in accordance with given image data on the displaying surface of the display. Further, although the reflection type liquid crystal micro-display may be used as the spatial light modulator 240, in this case, it is necessary to adopt a configuration in which light from the hologram recording medium 220 is made incident into the spatial light modulator 240 from obliquely upwards in the drawing.

As a matter of course, the spatial light modulator 240 which can be utilized in the present invention is not limited to a liquid crystal micro-display, and it does not matter that elements such as a DMD (Digital Micro-mirror Device) and LCOS (Liquid Crystal on Silicon), etc., are used.

If the projection optical system 250 is an optical system having a function of projecting a modulated image, which is obtained on the spatial light modulator 240, onto the screen 260, it does not matter which type of optical system is used. Usually, the projection optical system 250 is composed of a plurality of lenses so as to adjust the focal distance. Further, although the illustrated example is a forward projection type apparatus by which an image is observed with the viewpoint E placed at this side of the screen 260, a rearward projection type apparatus (a so-called rear projection apparatus) for observing an image with the viewpoint E placed at the other side of the screen 260 may be utilized as the projection type image display apparatus according to the present invention.

However, generally, with the rear projection type apparatus, it is possible to control generation of speckles by devising the material of the screen. That is, in the case of the rear projection type apparatus, since the light which can be observed by an observer becomes light transmitted through the screen, it is possible to cope with generation of speckles by applying a measure in which scattering particles are embedded in the screen. Therefore, in actual application, a technology for reducing speckles according to the present invention can exert full performance in a forward projection type apparatus which carries out forward projection for projecting a modulated image to the observation surface of the screen.

In addition, as exemplarily illustrated in FIG. 6 and FIG. 7, any framework may be adopted as long as the drive mechanism 225 has a mechanism for causing the hologram recording medium 220 to move on the XY-plane. However, in the apparatus produced experimentally by the present inventor, a stepping motor for driving in the X-axis direction and the Y-axis direction was provided, and simple harmonic oscillation or circular motion was carried out by a digital drive signal. Additionally, the drive mechanism 225 may be composed by using a piezoelectric element, a voice coil, ultrasonic motor, etc.

<<<Section 4. Advantages of the Present Invention>>>

Figure 8:
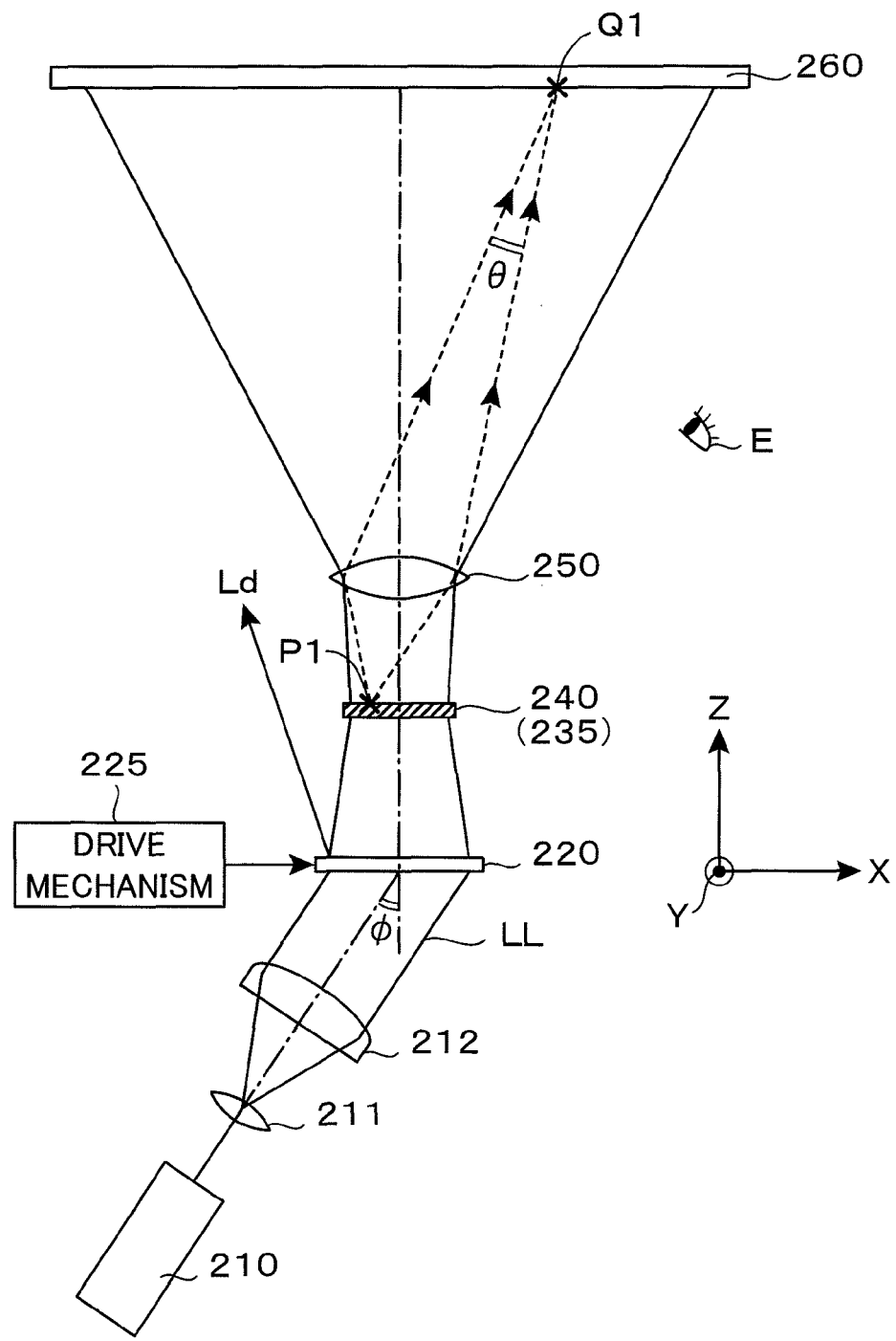
FIG. 8 is a plan view showing advantages of the projection type image display apparatus shown in FIG. 3.

Here, a description is given of advantages of the present invention with respect to a prior art apparatus exemplarily shown in FIG. 1. FIG. 8 is a plan view to show the advantages of the embodiment shown in FIG. 3. The configuration itself of the apparatus shown here is identical to the configuration of the apparatus shown in FIG. 3. Here, a description is given by comparing the prior art apparatus shown in FIG. 2 with the apparatus according to the embodiment shown in FIG. 8.

As described in Section 1, the first problematic point of the prior art apparatus shown in FIG. 2 resides in that a part of the laser light irradiated onto the scatter plate 120 is wasted without contributing to image display as exemplarily shown as the scattered light Ls. On the contrary, in the apparatus shown in FIG. 8, there is no case where any wasteful scattered light Ld as illustrated is brought about. This is because, as shown in FIG. 5, the light which has passed through the hologram recording medium 220 is diffracted to the direction of forming the hologram reproduction real image 235. Since the hologram recording medium 220 itself is not a scatter plate which scatters the incident light at random, any wasteful light oriented in the direction along which any reproduction image is not produced is not generated like the illustrated scattered light Ld. Therefore, the entire light irradiated on the hologram recording medium 220 will be effectively utilized in order to form a hologram reproduction real image 235.

The second problematic point of the prior art apparatus shown in FIG. 2 resides in that a large-scaled rotation mechanism to rotate the scatter plate 120 is required, and this hinders downsizing of the apparatus. On the contrary, in the case of the apparatus shown in FIG. 8, the drive mechanism 225 is not required to rotate the hologram recording medium 220 but may only carry out simple harmonic oscillation, circular motion or elliptical motion as shown in FIG. 6 and FIG. 7. Thus, the mechanism to make motions not including any rotating factor can be further downsized in comparison with the mechanism to make rotating motions, wherein power consumption can be reduced.

And, the third problematic point of the prior art apparatus shown in FIG. 2 resides in that, although speckles resulting from the light source side of illumination light can be reduced by rotating motions of the scatter plate 120, speckles resulting from the screen side cannot be reduced sufficiently. As described with respect to FIG. 2, since the spatial light modulator 140 is not a scatter plate, pixel information of the image point P1 is projected to the projection point Q1 on the screen 160 by the projection light L1 as it is, and when the projection optical system 150 is observed from the projection point Q1, the direction along which the projection light L1 is made incident into the projection point Q1 is always fixed. Thus, if the coherent light is irradiated from the same direction with respect to the surface of the screen 160 at all times, this becomes a large factor by which speckles are brought about.

On the contrary, in the apparatus shown in FIG. 8, a hologram reproduction real image 235 of the scatter plate is formed so as to overlap on the spatial position of the spatial light modulator 240. Accordingly, the light made incident into respective points on the spatial light modulator 240 will have already been multiplexed with respect to the angle. That is, as shown in FIG. 5, the respective points of the hologram reproduction real image 235 of the scatter plate will be composed of light coming from various points of the hologram recording medium 220. For this reason, the speckles at the light source side will disappear at this stage.

Further, since the hologram reproduction real image 235 of the scatter plate is formed so as to overlap on the spatial light modulator 240, the light from a modulated image formed on the spatial light modulator 240 carries out a behavior just like the behavior of the scattered light emitted from the scatter plate. Therefore, the pixel information of the image point P1 shown in FIG. 8 spreads as the information of the scattered light oriented in various directions, and is imaged at the projection point Q1 on the screen 260 by means of the lenses that compose the projection optical system 250. Here, the optical paths of the scattered light oriented from the image point P1 to the projection point Q1 are diversified (in the drawing, two optical paths are illustrated by a dotted line), and when the projection optical system 250 is observed from the projection point Q1, the incident angles of light incident into the projection point Q1 are diversified.

Finally, if the optical paths of incident light which are incident from various directions are bundled with respect to a specified projection point Q1, a conical body the top of which is the corresponding projection point Q1 will be formed. Here, the vertex angle θ of a triangle obtained by cutting the corresponding conical body along the center axis is generally called the "distribution angle of incident light." The angle θ formed by the optical path shown by a dotted line in FIG. 8 is the distribution angle of incident light with respect to the projection point Q1. The distribution angle of incident light θ takes different values for individual projection points, wherein generally the angle will become greater toward the center of the screen 260, and will become smaller toward the end parts of the screen 260.

The distribution angle of incident light θ at a specified projection point Q1 becomes a parameter showing the degree of multiplexing of the incident angle of light incident into the corresponding projection point Q1. The greater the distribution angle of incident light θ is, the greater the degree of multiplexing of the incident angle becomes, wherein light will be incident from further various directions in line therewith. And, the degree of multiplexing of the incident angle has a close relationship with a factor for speckle generation. That is, as described in "Speckle Phenomena in Optics" by Joseph W. Goodman, Roberts & Company Publishers 2006, if the degree of multiplexing of the incident angle is increased, generation of speckles can be accordingly reduced. Therefore, with respect to any projection point on the screen 260, if the distribution angle of incident light θ is increased as much as possible, generation of speckles is reduced.

Although the value of the actual distribution angle of incident light θ is determined based on the characteristics (particularly, the size of modulated image generating surface) and arrangement of the spatial light modulator 240, the characteristics (particularly, the aperture diameter and focal distance of lens) and arrangement of the projection optical system 250, and the characteristics (particularly, the scatter characteristics of size and scatter angle, which are determined in accordance with the positional relationship between the maximum take-in diameter of the projection lens and the light valve in the projection optical system 250) of the scatter plate 230 recorded in the hologram recording medium 220, the apparatus according to the present invention is able to further increase the distribution angle of incident light θ with respect to an optional projection point on the screen 260 in comparison with the apparatus proposed by the prior arts. This is because the hologram reproduction real image 235 of the scatter plate is formed so as to overlap on a spatial position of the spatial light modulator 240 as shown in FIG. 8.

As described above, if the apparatus configuration according to the present invention is adopted, light from a modulated image formed on the spatial light modulator 240 will carry out a behavior just like that of the scattered light emitted from the scatter plate, wherein the image information of the illustrated image point P1 is spread as the information of scattered light oriented toward various directions. In the illustrated example, the reason why the distribution angle of incident light θ is obtained with respect to the projection point Q1 is that the scattered light oriented to various directions from the image point P1 is condensed at the projection point Q1 by the projection optical system 250. Thus, the feature that "a hologram reproduction real image 235 of the scatter plate is formed so as to overlap on the position of the spatial light modulator 240" in the present invention carries out a remarkably important function in view of reducing speckles resulting from the screen side.

In addition thereto, the apparatus shown in FIG. 8 is provided with a device to further reduce speckles resulting from the screen side. This is a framework of driving the hologram recording medium 220 by the drive mechanism 225. As described above, with the present invention, it becomes possible to secure a further greater distribution angle of incident light θ in comparison with the prior art apparatus by forming the hologram reproduction real image 235 of the scatter plate so as to overlap on the position of the spatial light modulator 240, wherein although an effect to reduce speckles is obtained, the speckle reducing effect can be further improved by driving the hologram recording medium 220 by means of the drive mechanism 225.

As already described above, the drive mechanism 225 has a function of cyclically making parallel movements of the hologram recording medium 220 on the XY-plane (that is, the plane including the recording surface). If the hologram recording medium 220 is thus subjected to parallel movements, the hologram reproduction real image 235 of the scatter plate will also be subjected to parallel movements. However, since the spatial light modulator 240 remains still, the modulated image does not move, wherein there is no case where the image projected on the screen 260 moves. Therefore, the parallel movement of the hologram recording medium 220 on the XY-plane does not influence the original image projected on the screen 260 at all.

However, the parallel movement of the hologram recording medium 220 on the XY-plane functions to reduce speckles produced on the screen 260. The reason why such a speckle reducing effect is brought about can be easily understood by taking into consideration how drive of the hologram recording medium 220 gives influence on the light emitted from the image point P1 shown in FIG. 8. That is, since the pixels (pixels of the spatial light modulator 240) of the image point P1 remain still, the modulated image information given to the image point P1 does not change at all. However, since the reproduction real image 235 of the scatter plate, which is reproduced so as to overlap on the position of the image point P1, moves, the scattering phenomenon on the image point P1 will change from time to time. Accordingly, the characteristics of the scattered light oriented from the image point P1 to the projection point Q1 changes from time to time, wherein the scattering phenomenon produced at the projection point Q1 changes from time to time and is multiplexed from time to time. Thus, the speckles resulting from scattering brought about at the projection point Q1 are reduced.

In addition, the hologram recording medium 220 is cyclically moved by the drive mechanism in the embodiment shown herein. However, if the lenses that compose the projection optical system 250 are cyclically moved in the plane perpendicular to the optical axis instead thereof, the speckles resulting from scattering on the screen 260 can be reduced. However, if the lenses that compose the projection optical system 250 are moved, the image itself, which is projected on the screen 260, is caused to oscillate, and is caused to generate blur in images. Therefore, in actual application, it is preferable that the hologram recording medium 220 is driven.

Also, if the spatial light modulator 240 is caused to cyclically move along the modulated image forming surface instead of moving the hologram recording medium 220 by the drive mechanism, the speckles resulting from scattering produced on the screen 260 can be reduced. However, with this method, since the modulated image formed on the spatial light modulator 240 will be moved, the image projected on the screen 260 will be subjected to motion. If the displacement (amplitude) of the image on the screen 260 is controlled to only a slight amount, it becomes possible to avoid recognizing that the image is oscillating with the naked eye. However, in actual application, it is preferable that the hologram recording medium 220 is driven.

Further, as another method, the speckles resulting from scattering produced on the screen 260 can be reduced by cyclically moving, by the drive mechanism, the entire apparatus body composed of the coherent light source 210 functioning as the coherent light generating means, the magnification lens 211, the collimate lens 212, the hologram recording medium 220, the spatial light modulator 240 and the projection optical system 250. However, with this method, the image projected on the screen 260 is also moved, and the drive mechanism becomes large-scaled. Therefore, in actual application, it is preferable that only the hologram recording medium 220 is driven.

<<<Section 5. Optimum Numerical Value Conditions>>>

Subsequently, herein, the optimum numerical conditions in view of carrying out the basic embodiment described in Section 2 are shown. First, in order to search for what important factors are in view of reducing speckles in the projection type image display apparatus according to the present invention, the experimental results made by the present inventor are presented.

Figures 9, 10:
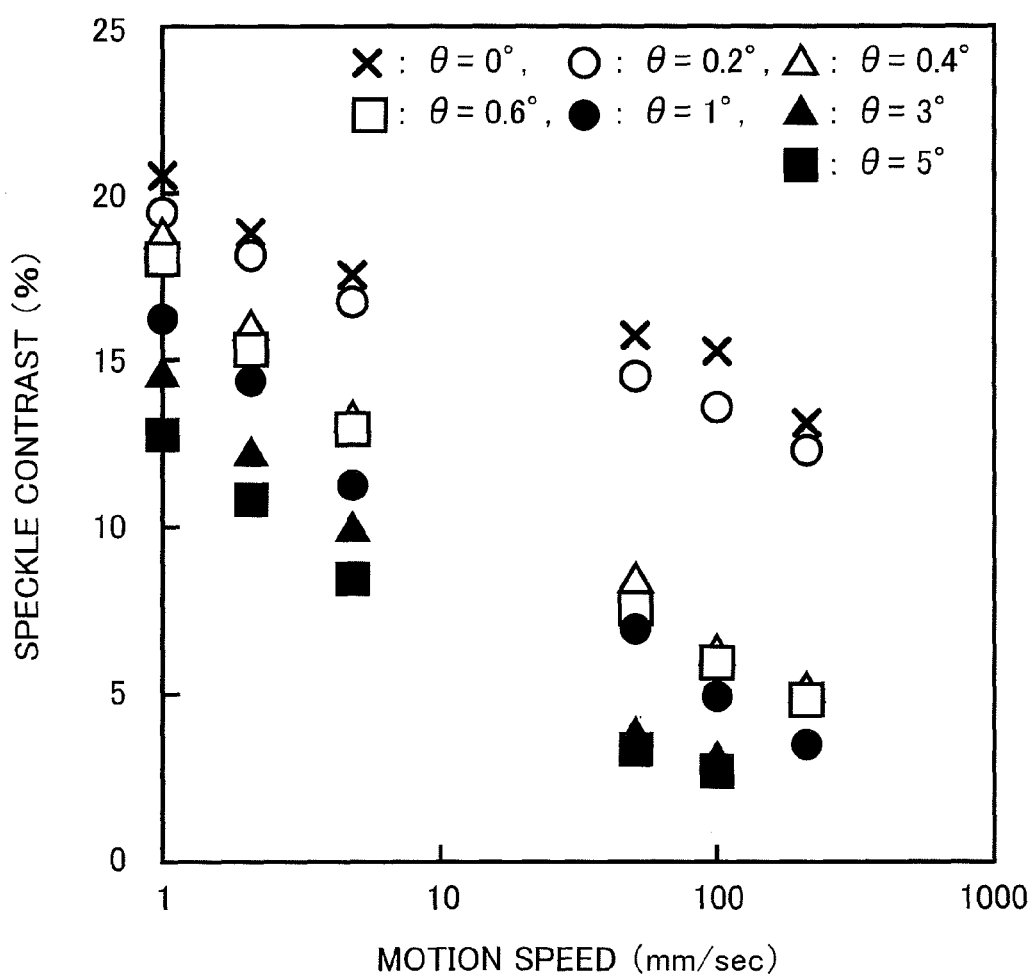
FIG. 9 is a table showing the degree of generation of speckles where experiments are carried out under various conditions.
FIG. 10 is a graph showing experimental results of the degree of generation of speckles where the distribution angle of incident light θ and linear speed of light flux scanning are used as parameters.

FIG. 9 is a table showing the degree of generation of speckles where experiments were carried out under various conditions. "Speckle Phenomena in Optics" by Joseph W. Goodman, Roberts & Company Publishers 2006 proposed a method of using numerical values called speckle contrasts (unit: %) as parameters showing the degrees of speckles brought about on the screen. The speckle contrast is defined as a numerical value obtained by dividing the standard deviations in brightness unevenness actually produced on the screen by the average value of the brightness when displaying a test pattern image which takes an original uniform distribution in brightness. This means that the greater the value of the speckle contrast becomes, the greater the degree of speckle generation on the screen is, wherein it shows that a spot-like brightness unevenness pattern is further remarkably presented to an observer.

The table of FIG. 9 shows the results of having measured speckle contrasts under three different conditions while utilizing the apparatus configuration shown in FIG. 3. First, the measurement result shown as the condition 1 is the result where, using a green laser as the light source 210, any diffusing element is not provided between the light source 210 and the spatial light modulator 240. In summary, it is the result of having measured the speckle contrast by means of a measurement system in which the hologram recording medium 220 is removed from the apparatus shown in FIG. 3. In this case, as shown in the table, a result that speckle contrast is 20.7% was obtained. This is a state where a spot-like brightness unevenness pattern can be considerably remarkably observed when being observed with the naked eye.

On the other hand, the measurement result shown as the condition 2 is the result of having measured the speckle contrast without driving the drive mechanism 225 in the apparatus configuration shown in FIG. 3. That is, it is the result of having measured the speckle contrast where a green laser is used as the light source, the hologram recording medium 220 functioning as a diffusing element is not driven and caused to remain still although the hologram recording medium 220 is disposed between the light source 210 and the spatial light modulator 240 (the measurement result in the case of having driven the hologram recording medium 220 is shown in the graph of FIG. 10 as described later). Also, in the measurement, such a condition was established where the distribution angle of incident light θ becomes 10 degrees or more at any point on the screen 260. In this case, as shown in the table, a result that the speckle contract is 17.9% was obtained. This is a state where a spot-like brightness unevenness pattern can be still observed when being observed with the naked eye.

On the contrary, the measurement result shown as the condition 3 is the result where, in the apparatus shown in FIG. 3, the light source 210 is replaced with a green LED (non-coherent light source), and any diffusing element is not provided between the LED and the spatial light modulator 240 (that is, where the hologram recording medium 220 is removed). In this case, as shown in the table, a result that the speckle contrast is 4.0% was obtained. This is a remarkably favorable state where almost no brightness unevenness pattern can be observed where being observed with the naked eye.

The reason why the measurement result according to the condition 3 showed a remarkably favorable result in comparison with the measurement results according to the conditions 1 and 2 is that the "non-coherent light source (LED)" was used as the light source. As already described above, in actual application, a problem of speckle generation is inherent to a case where the "coherent light source" such as a laser is used. The problem of speckle generation is a matter which is not required to be taken into consideration in an apparatus using a "non-coherent light source" such as a LED. Therefore, ideally, in an apparatus in which a "coherent light source" such as a laser is used, it is preferable that the speckle contrast is obtained which is similar to that of an apparatus using a "non-coherent light source."

Actually, in a case of usage for image display in HDTV (High-Definition Television), such a standard has been shown that the speckle contrast is 6.0% or less as the level at which a brightness unevenness pattern is hardly recognizable when an observer observes images with the naked eye (for example, refer to Patent Publication No. WO/2001/081996). Therefore, in an apparatus using a "coherent light source" such as a laser, it is one of the technical objects to reduce the speckle contrast to 6.0% or less.

According to the measurement result of FIG. 9, in the apparatus shown in FIG. 3, the speckle contrast could be reduced only by 2.8 points by providing a hologram recording medium 220 functioning as a diffusing element (condition 1 to condition 2). Indeed, although it is successful that the speckle is reduced to a certain extent by intervening the hologram recording medium 220, the result in which the speckle contrast is 17.9% is not a result that is satisfactory in actual applications.

Thus, the reason why the speckle contrast cannot be sufficiently reduced only by intervention of the hologram recording medium 220 is that, although speckles resulting from the light source side of the illumination light can be reduced, the speckles resulting from the screen side cannot be sufficiently reduced. In an apparatus according to the basic embodiment of the present invention, which is shown in FIG. 3, the following two approaches are taken in order to attempt to reduce the speckles.

The first approach is to secure a distribution angle of incident light θ at respective projection points. In the case of the prior art apparatus, the path of light incident into the projection point Q1 shown in FIG. 2 is only one, and the distribution angle of incident light θ is 0 degree. Therefore, it is not possible to attempt to reduce the speckles resulting from the screen side. On the contrary, in the case of the apparatus according to the present invention, scattered light from the image point P1 gathers through various optical paths at the projection point Q1 shown in FIG. 8, wherein it becomes possible to secure a distribution angle of incident light θ to a certain extent.

The second approach is drive by the drive mechanism 225. As described above, the drive mechanism 225 cyclically causes the hologram recording medium 220 to move in the recording surface (in the XY-plane). Here, paying attention to a single light emitted from a specified point of the hologram recording medium 220 toward a specified direction, the corresponding light will reach a predetermined projection point on the screen 260 while transmitting a predetermined point on the spatial light modulator 240. Accordingly, as the hologram recording medium 220 moves in the XY-plane, the final reach point of the single light (that is, the projection point on the screen 260) also moves, and scans on the screen 260. As in the example shown in FIG. 6, if the hologram recording medium 220 is subjected to simple harmonic oscillation in a predetermined axial direction, the projection point based on the corresponding light is subjected to simple harmonic oscillation on the screen, wherein, as in the example shown in FIG. 7, if the hologram recording medium 220 is caused to make a circular motion, the projection point based on the corresponding light will be subjected to a circular motion on the screen. Thus, the reason why the speckles resulting from the screen side can be reduced by causing the light to scan on the screen 260 is that speckle patterns will be integrated from time to time by light flux scanning.

Accordingly, using the apparatus according to the embodiment shown in FIG. 3, the present inventor has looked into how much the first approach (securing of the distribution angle of incident light θ) and the second approach (light flux scanning) contribute to a reduction in the speckle contrast. The result is shown in the graph of FIG. 10. The graph shows the experimental result showing the degree of generation of speckles (speckle contrast) where such a premise is established by which the hologram recording medium 220 is caused to intervene and is driven, and where the distribution angle of incident light θ and linear speed of light flux scanning are made into parameters.

The ordinate of the graph shows a speckle contrast value (unit: %) obtained in association with an image displayed on the screen 260. On the other hand, the motion speed shown on the abscissa of the graph is a motion speed of light used for scanning on the screen 260. The experiment was carried out by causing the hologram recording medium 220 to make a circular motion as shown in FIG. 7. At this time, the speed in the tangential direction of the corresponding circular motion was used as the motion speed of light. Also, the linear speed shown with the unit of "mm per second" is absolutely the scanning speed of light on the screen 260, and becomes a value obtained by multiplying the speed of circular motion of the hologram recording medium 220 in the tangential direction by a predetermined projection magnification.

Also, in the measurement system used for the experiment, such a setting was adopted, in which the effective diameter of emission light of the lens of the projection optical system 250 is 50 mm, the F number is 1.8, the distance between the lens and the screen 260 is approximately 7 m, the maximum angle to observe the hologram recording medium 220 from the center point of the spatial light modulator 240 is 15 degrees, and the maximum angle to observe the spatial light modulator 240 from the lens of the projection optical system 250 is 15 degrees. In such a setting, a modulated image on the spatial light modulator 240 is displayed by being magnified approximately 80 times on the screen 260. Therefore, light on the screen 260 will be subjected to scanning at a faster speed by approximately 80 times than the motion speed when the hologram recording medium 220 is driven by the drive mechanism 225.

The graph shows the measurement result in regard to seven distribution angles of incident light θ. That is, seven results in which the distribution angles of incident light θ is 0, 0.2, 0.4, 0.6, 1, 3, and 5 degrees are plotted therein. As described above, the value of the distribution angle of incident light θ is determined depending on the characteristics and arrangement of the spatial light modulator 240, the characteristics and arrangement of the projection optical system 250, and the characteristics of the recorded scatter plate 230. For example, if the plane size of the spatial light modulator 240 is made small, and the projection magnification by the projection optical system 250 is made large, the distribution angle of incident light θ is increased although the same image size is obtained on the same screen 260. Therefore, respective settings are carried out so that the seven distribution angles of incident light θ can be obtained by various changing the parameters which are the characteristics and arrangement of the spatial light modulator 240 and the characteristics and arrangement of the projection optical system 250, measurement was made for the value of the speckle contrast in regard to each of the settings.

In addition, as described above, the distribution angle of incident light θ takes a different value for each of the positions on the screen 260. The distribution angle of incident light θ becomes greater toward the middle of the screen 260, and becomes smaller toward the end parts of the screen 260. Therefore, herein, the smallest value among the distribution angles of incident light θ with respect to respective projection points on the screen 260 is made into the minimum distribution angle of incident light (the projection point where the minimum distribution angle of incident light is obtained is a projection point at the end parts of the screen 260), wherein seven distribution angles of incident light θ which are 0, 0.2, 0.4, 0.6, 1, 3 and 5 degrees were set on the basis of the projection point where the minimum distribution angle of incident light can be obtained. Therefore, the condition setting in which the result of the distribution angle of incident light θ was 0.2 degrees was obtained in the graph of FIG. 10 means the condition setting in which the distribution angle of incident light θ was 0.2 degrees was obtained at a projection point (at the end part of the screen 260) at which the minimum distribution angle of incident light is obtained on the screen 260 (As a matter of course, a distribution angle of incident light θ which is more than this was obtained at the middle part of the screen 260). It means that such a setting in which at least the distribution angle of incident light θ of 0.2 degrees is obtained is carried out at any point on the screen 260.

Looking at the graph of FIG. 10, it is found that a significant difference is produced with respect to the value of speckle contrast between the result in which the distribution angle of incident light θ is 0.2 degrees plotted with a circle and the result in which the distribution angle of incident light θ is 0.4 degrees plotted with a triangle. This means that an effect by which speckle generation is remarkably reduced can be obtained by setting the distribution angle of incident light θ to 0.4 degrees or more. In other words, if the characteristics and arrangement of the spatial light modulator 240 and the characteristics and arrangement of the projection optical system 250 are set so that any one of the distribution angles of incident light with respect to an optional point on the screen 260 becomes 0.4 degrees or more, an effect by which speckle generation can be remarkably reduced can be brought about. This means that, in the setting by which the distribution angle of incident light becomes 0.4 degrees or more, the incident angle is sufficiently multiplexed at one projection point (a number of angle modes not having any correlation with each other are incorporated).

Next, where such a premise is established by which the setting is carried out by which the distribution angle of incident light with respect to any optional point on the screen 260 becomes 0.4 degrees or more, an ideal condition by which the speckle contrast similar to that of the apparatus using a "non-coherent light source" is obtained is taken into consideration. As described above, in the case of usage for image display in HDTV (High-Definition Television), the standard in which the speckle contrast is 6.0% or less is shown as the level at which the brightness unevenness pattern is hardly recognizable when an observer observes the image with the naked eye. As has been understood from the graph shown in FIG. 10, unless the hologram recording medium 220 is moved, it is absolutely impossible to obtain an ideal speckle contrast which is 6.0% or less (according to the result in which the motion speed is 1 mm per second, the speckle contrast is 10% or more in any case). Therefore, it is a premise that, in order to obtain an ideal speckle contrast, the hologram recording medium 220 is driven by the drive mechanism 225. As shown in the graph, the higher the motion speed becomes, the lower the speckle contrast becomes. However, on the premise in which the distribution angle of incident light is caused to become 0.4 degrees or more, it is understood that it is sufficient that the motion speed is set to 200 mm or more per second in order to obtain an ideal speckle contrast of 6.0% or less.

Although the present inventor carried out similar experiments using various types of forward projection screens which are currently available on the market, the results which are similar to those in the graph shown in FIG. 10 were obtained in either case. In addition, similar experiments were carried out by using a plurality of different scatter plates with respect to the scatter plate 230 that becomes an original image recorded in the hologram recording medium 220, the results which are similar to those in the graph shown in FIG. 10 were obtained in either case. Therefore, it can be said that the experimental results shown in the graph of FIG. 10 have universality not depending on the characteristics of a scatter plate used, etc., if the screen is a forward projection type screen (As a matter of course, it is a premise that a scatter plate used has sufficient scatter characteristics necessary to carry out the invention.).

Finally, in the case of the forward projection type embodiment shown in FIG. 3, the conditions are obtained as the ideal numerical value conditions, by which the characteristics (in particular, the size of the modulated image generation surface) and arrangement of the spatial light modulator 240, and the characteristics (in particular, the aperture diameter and the focal distance of lenses) and arrangement of the projection optical system 250 are set so that the distribution angle of incident light at any optional point on the screen becomes 0.4 degrees or more (in other words, so that the distribution angle of incident light at any position on the screen becomes 0.4 degrees or more), and the hologram recording medium 220 is driven by the drive mechanism 225 so that the linear speed of light used for scanning on the screen 260 becomes 200 mm or more per second. For example, in a case where the modulated image on the spatial light modulator 240 is magnified by approximately 80 times on the screen 260, it is sufficient that the actual motion speed in driving the hologram recording medium 220 by the drive mechanism 225 is set to 2.5 mm or more per second.

Further, where the hologram recording medium 220 is subjected to a circular motion as shown in FIG. 7 (or an elliptical motion), since the linear speed of light can be maintained at a fixed speed, the corresponding fixed speed (the moving speed on the screen) may be set to become 200 mm or more per second. However, where being subjected to simple harmonic oscillation as shown in FIG. 6, it is not possible that the linear speed of light is maintained at a fixed speed. That is, since the motion speed temporarily becomes zero at the end point of the simple harmonic oscillation, speckles will be observed at that moment. Therefore, where being subjected to simple harmonic oscillation, it is preferable that the standstill time at the end point is controlled to a short time in which speckles cannot be observed. In detail, where a moving image is displayed as an image, it is preferable that the standstill time at the end point is controlled to 1/30 seconds or less, which is a usual moving image bit rate.

<<<Section 6. Application to Color Image Display Apparatus>>>

The embodiments described above are examples in which monochrome laser (in detail, DPSS laser the wavelength λ of which is 532 nm (green)) is used as the coherent light source 210. The images obtained on the screen 260 will be monochrome images corresponding to the laser color. However, when utilizing the same in a general optical type projection apparatus, it is preferable that the display apparatus is utilized as a color image display apparatus. Therefore, herein, a description is given of an embodiment in which the apparatus according to the present invention is used as a color image display apparatus.

Figure 11:
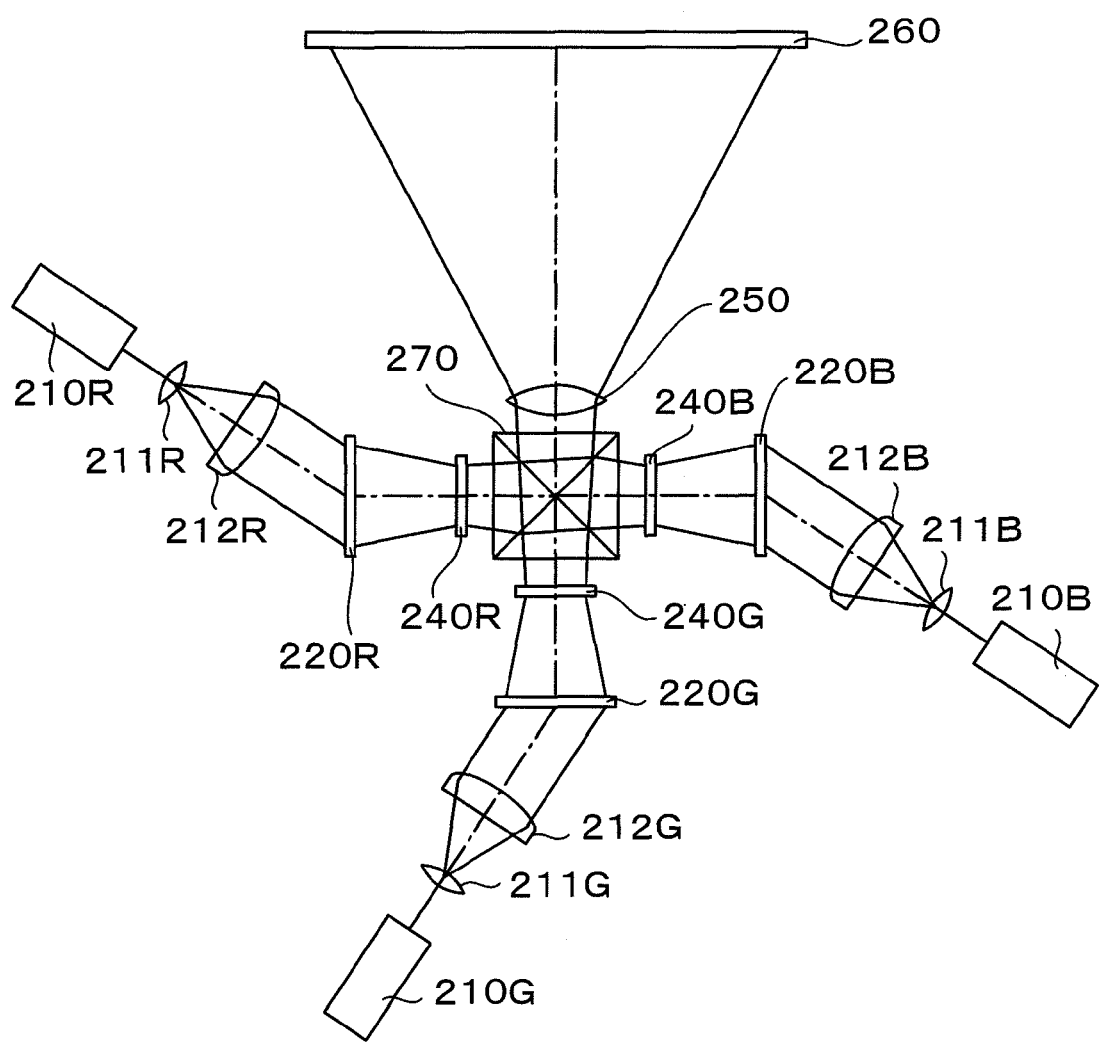
FIG. 11 is a plan view showing an embodiment in which the present invention is applied to a color image display apparatus.

FIG. 11 is a plan view showing an embodiment in which the present invention is applied to a color image display apparatus. In order to apply the present invention to a color image display apparatus, basically, the portions not including the projection optical system 250 and the screen 260 among the components shown in FIG. 3 are prepared for each of the three primary colors R, G and B, modulated images are independently generated for each of the three primary colors R, G and B, and the three modulated images are synthesized and are projected on a screen.

A cross dichroic prism 270 shown at the middle part of FIG. 11 has a function of synthesizing the modulated images for each of the three primary colors R, G and B and an image thus synthesized is projected onto the screen 260 by the projection optical system 250.

The components disposed downward of the cross dichroic prism 270 are components to generate modulated images of G color (green), which are composed of a coherent light source (laser) 210G, a magnification lens 211G, a collimate lens 212G, a hologram recording medium 220G, and a spatial light modulator (for example, a liquid crystal micro-display) 240G. These respective components are identical to the coherent light source 210, the magnification lens 211, the collimate lens 212, the hologram recording medium 220, and the spatial light modulator 240, which are shown in FIG. 3. A G-color component image of a color image to be displayed is modulated by the spatial light modulator 240G to generate a G-color modulated image.

On the other hand, the components disposed leftward of the cross dichroic prism 270 are components to generate modulated images of R color (red), which are composed of a coherent light source (laser) 210R, a magnification lens 211R, a collimate lens 212R, a hologram recording medium 220R, and a spatial light modulator (for example, a liquid crystal micro-display) 240R. These respective components correspond to the coherent light source 210, the magnification lens 211, the collimate lens 212, the hologram recording medium 220, and the spatial light modulator 240, which are shown in FIG. 3. Since it is necessary to generate a modulated image of R color, a laser light source for emitting laser light having a wavelength band of R color is used as the coherent light source 210R. In addition, in the recording process (refer to FIG. 4) of a scatter plate corresponding to the hologram recording medium 220R, R-color illumination light L and R-color reference light Lr are used. By irradiating R-color illumination light for reproduction LL, an R-color reproduction real image 235 will be formed. And, an R-color component image of a color image to be displayed is modulated by the spatial light modulator 240R to generate an R-color modulated image.

Similarly, the components disposed rightward of the cross dichroic prism 270 are components to generate modulated images of B color (blue), which are composed of a coherent light source (laser) 210B, a magnification lens 211B, a collimate lens 212B, a hologram recording medium 220B, and a spatial light modulator (for example, a liquid crystal micro-display) 240B. These respective components correspond to the coherent light source 210, the magnification lens 211, the collimate lens 212, the hologram recording medium 220, and the spatial light modulator 240, which are shown in FIG. 3. However, since it is necessary to generate a modulated image of B color, a laser light source for emitting laser light having a wavelength band of B color is used as the coherent light source 210B. In addition, in the recording process (refer to FIG. 4) of a scatter plate with respect to the hologram recording medium 220B, B-color illumination light L and B-color reference light Lr are used. By irradiating B-color illumination light for reproduction LL, a B-color reproduction real image 235 will be formed. And, a B-color component image of a color image to be displayed is modulated by the spatial light modulator 240B to generate a B-color modulated image.

The R-color modulated image generated by the spatial light modulator 240R, the G-color modulated image generated by the spatial light modulator 240G and the B-color modulated image generated by the spatial light modulator 240B are synthesized by the cross dichroic prism 270, and the color image thus synthesized is projected onto the screen 260 by the projection optical system 250.

Finally, where the present invention is applied to a projection type image display apparatus for projecting light onto a screen and displaying a color image, the first wavelength band, the second wavelength band and the third wavelength band, which correspond to three primary color components, are set, and modulated imaging portions which are independent from each other may be provided for individual wavelength bands.

Here, the first modulated imaging portion includes the first coherent light generating means for generating coherent light having the first wavelength band, which consists of a parallel light flux, the first hologram recording medium for generating a hologram reproduction real image of a scatter plate by receiving the coherent light of the first wavelength band as illumination light for reproduction, and the first spatial light modulator which is disposed so as to overlap on the forming position of the first hologram reproduction real image and carries out modulation based on an image having the first primary color component corresponding to the first wavelength band.

Also, the second modulated imaging portion includes the second coherent light generating means for generating coherent light having the second wavelength band, which consists of a parallel light flux, the second hologram recording medium for generating a second hologram reproduction real image of a scatter plate by receiving the coherent light of the second wavelength band as illumination light for reproduction, and the second spatial light modulator for carrying out modulating based on an image disposed so as to overlap on the forming position of the second hologram reproduction real image and having the second primary color component corresponding to the second wavelength band.

On the other hand, the third modulated imaging portion includes the third coherent light generating means for generating coherent light having the third wavelength band, which consists of a parallel light flux, the third hologram recording medium for generating a third hologram reproduction real image of a scatter plate by receiving the coherent light of the third wavelength band as illumination light for reproduction, and the third spatial light modulator for carrying out modulating based on an image disposed so as to overlap on the forming position of the third hologram reproduction real image and having the third primary color component corresponding to the third wavelength band.

And, it may be sufficient that the projection type image display apparatus for carrying out the color image display is provided with a synthesizing projection optical system for synthesizing the first modulated image obtained on the first spatial light modulator, the second modulated image obtained on the second spatial light modulator and the third modulated image obtained on the third spatial light modulator and projecting the same on a screen. In addition, although the drive mechanism is not depicted in the drawing, in actual applications, it is preferable that a drive mechanism for causing the individual hologram recording media 220R, 220G and 220B to cyclically make a parallel movement in the plane parallel to the respective recording surfaces is provided.

What is claimed is:

1. A projection type image display apparatus for projecting light onto a screen and displaying an image thereon, comprising:
   a coherent light generating unit for generating coherent light including almost parallel light flux;
   a hologram recording medium for generating a hologram reproduction real image of a scatter plate by receiving the coherent light as illumination light for reproduction;
   a spatial light modulator disposed so as to overlap on a position where the hologram reproduction real image is generated; and
   a projection optical system for projecting a modulated image obtained on the spatial light modulator onto the screen,
   wherein
   the spatial light modulator receives illumination of the hologram reproduction real image to generate the modulated image as a contrast pattern of the illumination, and the projection optical system carries out a function of projecting said modulated image obtained on the spatial light modulator on the screen.

2. The projection type image display apparatus according to claim 1, wherein the coherent light generating unit includes:
   a laser light source for generating and emitting laser light; and
   a optical system for magnifying a light flux, which widens the laser light emitted from the laser light source to an almost parallel light flux having a predetermined sectional area.

3. The projection type image display apparatus according to claim 1, wherein the hologram recording medium is composed of a volume hologram using a photopolymer.

4. The projection type image display apparatus according to claim 1, wherein
   the coherent light generating unit generates coherent light having a wavelength which is almost the same as a wavelength of light used when recording an image of a scatter plate on a hologram recording medium; and
   the hologram recording medium is disposed in a direction along which an incident angle of the coherent light to a corresponding hologram recording medium becomes identical to an incident angle of reference light used when recording the image of the scatter plate.

5. The projection type image display apparatus according to claim 1, wherein the spatial light modulator is composed of a transmission type or a reflection type liquid crystal display or digital micro-mirror device.

6. The projection type image display apparatus according to claim 1, wherein the projection optical system carries out forward projection by which a modulated image is projected to an observation surface of a screen.

7. The projection type image display apparatus according to claim 1, wherein characteristics and an arrangement of the spatial light modulator and characteristics and an arrangement of the projection optical system are set so that either of distribution angles of incident light to any optional point on the screen becomes 0.4 degrees or more.

8. The projection type image display apparatus according to claim 1, further including a drive mechanism for cyclically moving the hologram recording medium.

9. The projection type image display apparatus according to claim 8, wherein the drive mechanism causes the hologram recording medium to cyclically make a parallel movement in a plane parallel to the recording surface thereof.

10. The projection type image display apparatus according to claim 9, wherein when an XY two-dimensional orthogonal coordinate system is defined on a recording surface of the hologram recording medium, the drive mechanism causes the hologram recording medium to make simple harmonic oscillations in an X-axis or a Y-axis direction or causes the hologram recording medium to make a circular motion or an elliptical motion on an XY-plane.

11. The projection type image display apparatus according to claim 8, wherein
   characteristics and an arrangement of the spatial light modulator and characteristics and an arrangement of the projection optical system are set so that either of distribution angles of incident light to any optional point on the screen becomes 0.4 degrees or more, and
   the drive mechanism drives the hologram recording medium so that a linear speed of light used for scanning on the screen becomes 200 mm or more per second.

12. The projection type image display apparatus according to claim 1, further including a drive mechanism for causing lenses, which compose the projection optical system, to cyclically move in a plane perpendicular to an optical axis thereof.

13. The projection type image display apparatus according to claim 1, further including a drive mechanism for causing the spatial light modulator to cyclically move along a modulated image forming surface.

14. The projection type image display apparatus according to claim 1, further including a drive mechanism for causing the entire apparatus, which is composed of the coherent light generating unit, the hologram recording medium, the spatial light modulator, and the projection optical system, to totally move cyclically.

15. A projection type image display apparatus for projecting light onto a screen and displaying a color image thereon, comprising:
   a first unit for generating coherent light of a first wavelength, which consists of a parallel light flux;
   a first hologram recording medium for generating a first hologram reproduction real image of a scatter plate by receiving coherent light of the first wavelength as illumination light for reproduction;
   a first spatial light modulator which is disposed so as to overlap on a forming position of the first hologram reproduction real image and carries out modulation based on an image having a first primary color component corresponding to the first wavelength;
   a second unit for generating coherent light of a second wavelength, which consists of a parallel light flux;
   a second hologram recording medium for generating a second hologram reproduction real image of a scatter plate by receiving coherent light of the second wavelength as illumination light for reproduction;
   a second spatial light modulator which is disposed so as to overlap on a forming position of the second hologram reproduction real image and carries out modulation based on an image having a second primary color component corresponding to the second wavelength;
   a third unit for generating coherent light of a third wavelength, which consists of a parallel light flux;
   a third hologram recording medium for generating a third hologram reproduction real image of a scatter plate by receiving coherent light of the third wavelength as illumination light for reproduction;
   a third spatial light modulator which is disposed so as to overlap on a forming position of the third hologram reproduction real image and carries out modulation based on an image having a third primary color component corresponding to the third wavelength; and
   a synthesizing projection optical system for synthesizing a first modulated image obtained on the first spatial light modulator, a second modulated image obtained on the second spatial light modulator, and a third modulated image obtained on the third spatial light modulator, and projecting a synthesized image onto the screen,
wherein
   the first spatial light modulator receives first illumination of the first hologram reproduction real image to generate the first modulated image as a contrast pattern of the first illumination,
   the second spatial light modulator receives second illumination of the second hologram reproduction real image to generate the second modulated image as a contrast pattern of the second illumination,
   the third spatial light modulator receives third illumination of the third hologram reproduction real image to generate the third modulated image as a contrast pattern of the third illumination, and
   the synthesizing projection optical system carries out a function of projecting the synthesized image obtained by synthesizing said first modulated image, said second modulated image and said third modulated image on the screen.

16. A projection type image display method for projecting light onto a screen and displaying an image thereon, comprising the steps of:
   creating a hologram recording medium on which a hologram image of a scatter plate is recorded;
   generating a hologram reproduction real image of the scatter plate by irradiating coherent light onto the hologram recording medium;
   disposing a spatial light modulator so as to be overlapped on a generation position of the hologram reproduction real image; and
   projecting a modulated image obtained on the spatial light modulator on the screen,
wherein
   the spatial light modulator receives illumination of the hologram reproduction real image to generate the modulated image as a contrast pattern of the illumination, and
   said modulated image obtained on the spatial light modulator is projected on the screen.

17. The projection type image display method according to claim 16, wherein a hologram recording medium is caused to cyclically make a parallel movement on a plane parallel to a recording surface thereof while a modulated image is being projected on the screen.

18. The projection type image display method according to claim 17, wherein a distribution angle of incident light is caused to become 0.4 degrees or more at any optional point on a screen, and a linear speed of light scanning on the screen is caused to become 200 mm or more per second.

* * * * *